United States Patent [19]

Freeman

[11] Patent Number: 4,809,205
[45] Date of Patent: Feb. 28, 1989

[54] DIGITAL SINE CONVERSION CIRCUIT FOR USE IN DIRECT DIGITAL SYNTHESIZERS

[75] Inventor: Richard A. Freeman, Cedar Rapids, Iowa

[73] Assignee: Rockwell International Corporation, El Segundo, Calif.

[21] Appl. No.: 934,228

[22] Filed: Nov. 19, 1986

[51] Int. Cl.[4] .................................................. G06F 1/02
[52] U.S. Cl. ..................................... 364/721; 364/729
[58] Field of Search .............. 364/721, 718, 607, 729; 328/14

[56] References Cited

U.S. PATENT DOCUMENTS

| | | | |
|---|---|---|---|
| 3,813,528 | 5/1974 | Blanding | 364/729 |
| 3,825,737 | 7/1974 | Crosier | 364/607 X |
| 3,898,446 | 8/1975 | Vatz | 364/721 X |
| 4,064,423 | 12/1977 | Atkisson, Jr. | 364/718 |
| 4,077,063 | 2/1978 | Lind | 364/729 |
| 4,159,526 | 6/1979 | Mosley, Jr. et al. | 364/721 |
| 4,225,936 | 9/1980 | Lische | 364/718 |
| 4,331,941 | 5/1982 | Kovalick et al. | 332/31 R |
| 4,338,674 | 7/1982 | Hamada | 364/718 |
| 4,346,448 | 8/1982 | Insam et al. | 364/607 |
| 4,476,536 | 10/1984 | Jones, Jr. | 364/721 |
| 4,482,974 | 11/1984 | Kovalick | 364/607 |
| 4,482,975 | 11/1984 | King et al. | 364/608 |
| 4,484,296 | 10/1984 | Treise et al. | 364/607 |
| 4,486,846 | 12/1984 | McCallister et al. | 364/607 |

*Primary Examiner*—Gary V. Harkcom
*Assistant Examiner*—Tan V. Mai
*Attorney, Agent, or Firm*—M. Lee Murrah; V. Lawrence Sewell; H. Fredrick Hamann

[57] ABSTRACT

The size, power, and speed constraints in digital sinusoidal waveform generators using values stored in a read-only-memory are alleviated by storing the required values in two smaller read-only-memory devices containing a primary amplitude value and a secondary amplitude value, and a third read-only-memory containing corrective values, the total number of values in the three read-only-memory devices being reduced over the number in a single read-only-memory. The primary and secondary values are combined in accordance with disclosed trigonometric identities in response to a repetitive binary count, and the corrective values are added as determined by logic circuitry responding to the same binary count.

10 Claims, 3 Drawing Sheets

FIG 1
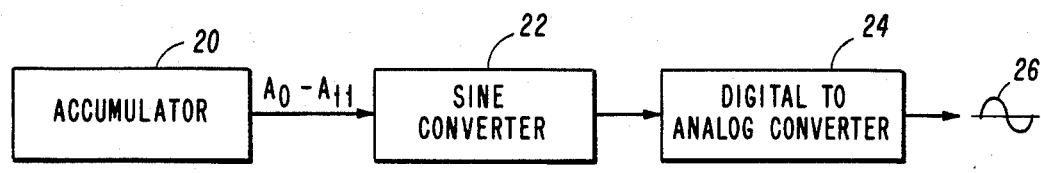
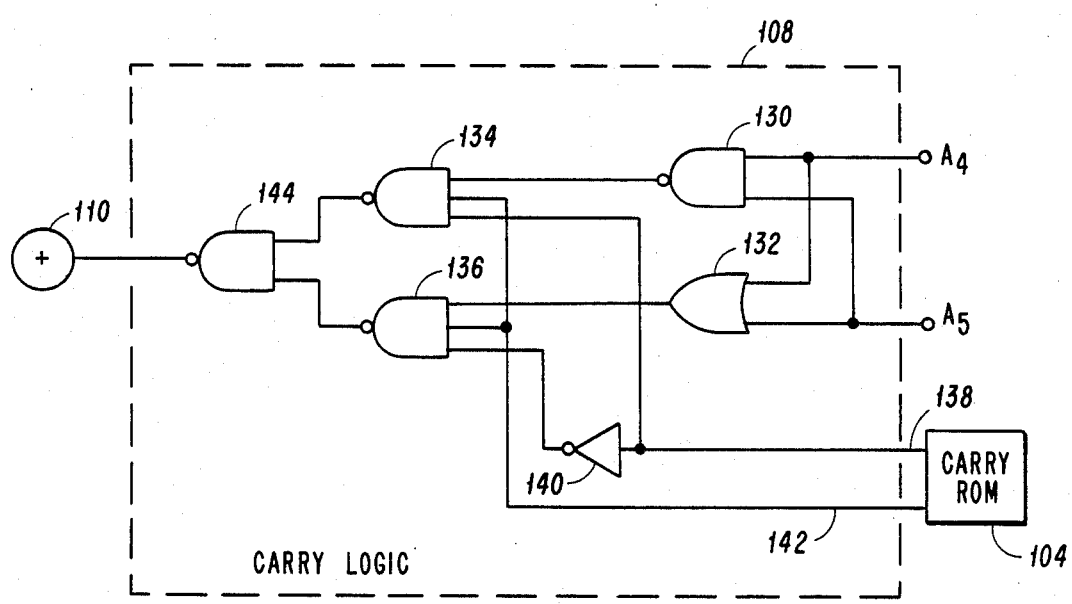
FIG 4

DIGITAL SINE CONVERSION CIRCUIT FOR USE IN DIRECT DIGITAL SYNTHESIZERS

BACKGROUND OF THE INVENTION

The invention relates to radio receivers and transmitters, and more particularly to digital synthesizers for use in such equipment.

It is common in radio receiver and transmitter circuits to use direct digital synthesizers to generate a sinusoidal waveform for use in frequency conversion, modulation, and the like. Most commonly, waveform synthesis is accomplished by feeding the output of an accumulator to a discrete read-only-memory (ROM) containing a lookup table. For each value output by the accumulator, each of which represents a phase angle in the sinusoidal waveform cycle, the ROM provides an amplitude value for the waveform corresponding to the phase angle. The resulting successive digital amplitude values are fed to a digital-to-analog converter, which produces a digital (i.e., stepped) approximation of a sinusoidal waveform. With proper filtering, the higher frequency components contained in the waveform steps can be removed to produce a pure sinusoidal waveform.

This design, however, has several drawbacks. First, it requires a large amount of memory, which translates into large chip sizes, which frustrate miniaturization efforts. Second, accessing memory is relatively slow, which limits the ROM access rate. Finally, large chips dissipate large amounts of power.

An approach to solving the problems of the one ROM synthesis method is to view the phase angle of the sinusoidal waveform which is being synthesized as the sum of two angles. In accordance with trigonometric identities hereinafter discussed, the sinusoidal waveform can be synthesized as a function of values stored in two ROMs. While this approach helps to alleviate the problem, the memory requirements are still extensive.

It is therefore an object of the present invention to provide a direct digital synthesizer which requires less memory.

It is another object of the present invention to provide a direct digital synthesizer which conserves circuit board area.

It is a further object of the present invention to provide a direct digital synthesizer which increases synthesis speed.

It is an additional object of the present invention to provide a direct digital synthesizer which reduces power dissipation.

With these and other objects of the invention in view, the present invention digitally generates a sinusoidal waveform by dividing the sine wave into a plurality of coarse phase angle intervals, which are in turn divided into a plurality of intermediate phase angle intervals. The amplitude value for each coarse phase angle interval and intermediate phase interval is digitally constructed from a value representing the phase angle, and three different types of values stored in three separate memory devices. A coarse value, which provides the basic value for each coarse phase interval, is modified through combination with a slope value and a carry value for each intermediate phase angle interval. The phase angle is multiplied by the slope value at each intermediate phase angle interval, and the carry value is added to the result. This result is, in turn, added to the coarse value at each intermediate phase angle interval. The operation is repeated for each coarse interval to produce 180 degrees of a complete sine wave cycle. The entire operation is then repeated, and the values are negatived to produce the second 180 degrees of the sine wave cycle.

In a more detailed aspect of the invention, the values in the carry register are selected to provide the value 1 in a first portion of the intermediate phase interval and the value 0 in the second portion of the intermediate phase interval. Depending upon the coarse interval the first portion can precede or follow the second portion.

In a still further detailed aspect of the invention, the values in the carry register are chosen such that the portions of the intermediate interval having the value 1 constitutes three-fourths of the intermediate phase interval.

In yet another detailed aspect of the invention, the carry value is held in a carry register holds two digital bits, the first of which determines whether the value 1 is to be added at each intermediate phase interval, and the second of which determines whether that value will be added to the initial or the last three-fourths of the intermediate phase angle

BRIEF DESCRIPTION OF THE DRAWINGS

The invention may be understood by a reading of the following description of a preferred embodiment thereof in conjunction with the accompanying drawings wherein:

FIG. 1 is a block diagram of a generalized digital sine waveform generator in which the present invention may be used;

FIG. 4 is a schematic diagram of the carry logic circuitry shown in FIG. 3.

DESCRIPTION OF A PREFERRED EMBODIMENT

The invention may be used in a direct frequency synthesizer (DDS) as shown in FIG. 1. The direct digital synthesizer uses an accumulator 20 to provide a repetitive count from zero to a maximum number determined by the number of bits embodied in the accumulator. In the present invention a total of twelve bits designated $A_0$–$A_{11}$ are used, although any other suitable number might be used. Using twelve bits, the accumulator count varies from zero to $2^{12}-1$, or 2048 decimal. When the count reaches 2048, the accumulator restarts the count at zero.

The count in accumulator 20 is presented to a sine converter 22 in accordance with the present invention, which produces an amplitude value for each count value. Thus, as accumulator 20 sweeps through its range of count values, sine converter 22 produces a full range of amplitude values representative of a sinusoidal waveform as its phase angle varies from zero degrees to 360 degrees. The output from sine converter 22 is presented to a digital-to-analog converter 24 which generates an analog sinusoidal waveform 26 representative of the values generated by sine converter 22.

Figure 2:
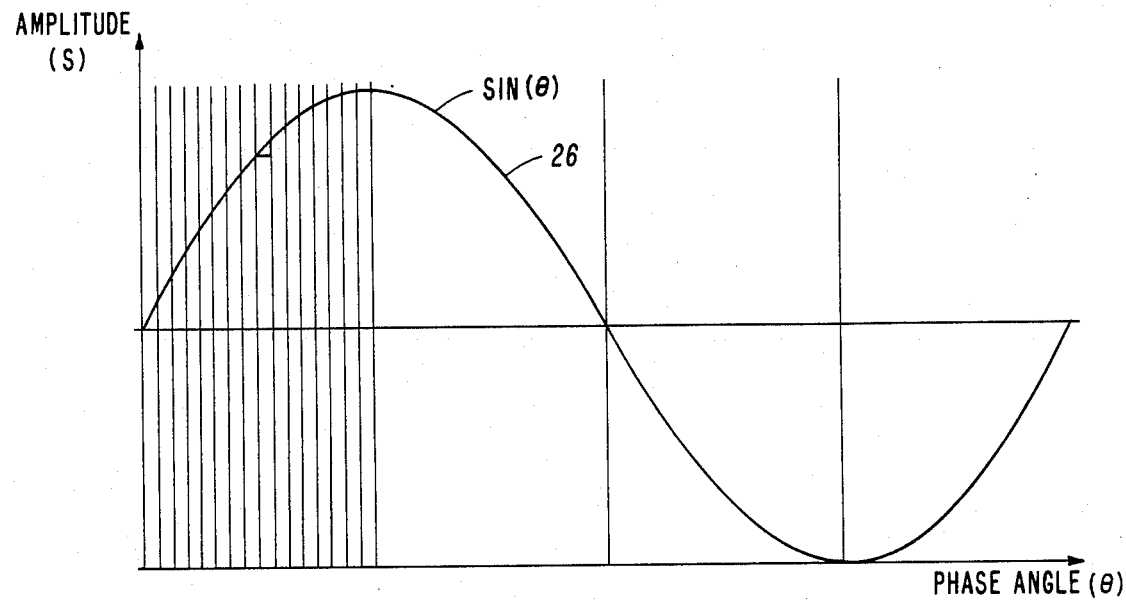
FIG. 2 is a graph illustrating the manner in which the sine waveform is divided into polarities, quadrants, sections and points in accordance with the present invention.
Figure 2:
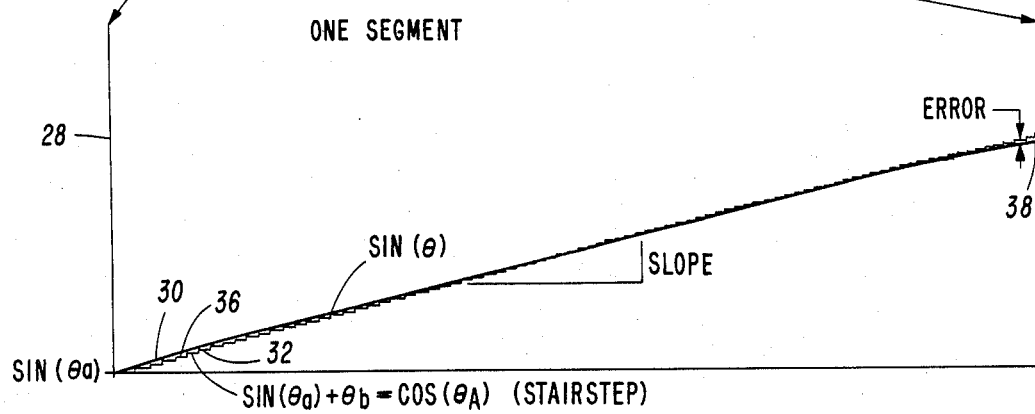

Sine converter 22 generates waveform 26 in multiple parts as depicted in FIG. 2. Waveform 26, whose amplitude S is defined as a function of phase angle $\theta$ by the formula:

$$S = \sin(\theta), \quad (1)$$

is generated as a function of accumulator output bits $A_0$–$A_{11}$. The most significant bit $A_{11}$ divides waveform 26 into a positive polarity portion represented by the binary bit 0 and a negative portion represented by the binary bit 1, as shown by the chart line labelled $A_{11}$. Accumulator bit $A_{10}$ further divides each polarity segment into four quadrants, as shown by the chart line labelled $A_{10}$. Each of the quadrants is successively divided into 16 segments ($\theta_a$) by accumulator bits $A_6$–$A_9$. Finally, each of the sixteen segments is broken into 64 points ($\theta_b$) as illustrated in the breakout 28 of one such segment.

The ideal sine wave of formula (1) which is illustrated by continuous line 30 may be approximated by stair-stepped line 32 as a function of two angles $\theta_a$ and $\theta_b$ according to the following formula:

$$S = \sin(\theta_a) + \theta_b \times \cos(\theta_a). \quad (2)$$

The amplitude at each point along line 32 is representative of the bits $A_0$–$A_5$ as they are incremented in time as shown from left to right in the accompanying chart 34.

Due to the "linear" nature of line 32 as compared to the non-linear nature of line 30, an error region 36 manifested as a difference in amplitude between lines 30 and 32 occurs at the beginning of line 23, and a similar error region 38 occurs at the end of line 32. The present invention operates to eliminate error regions 36 and 38 which are characteristically present when direct digital synthesizers using the two ROM lookup table method are used. This is accomplished by adding a "carry" bit at appropriate places in the section to compensate for the error region. This process is expressed in the following formula:

$$S = \sin(\theta_a) + \theta_b \times \cos(\theta_a) + c(\theta_a, \theta_b) \quad (3)$$

Figure 3:
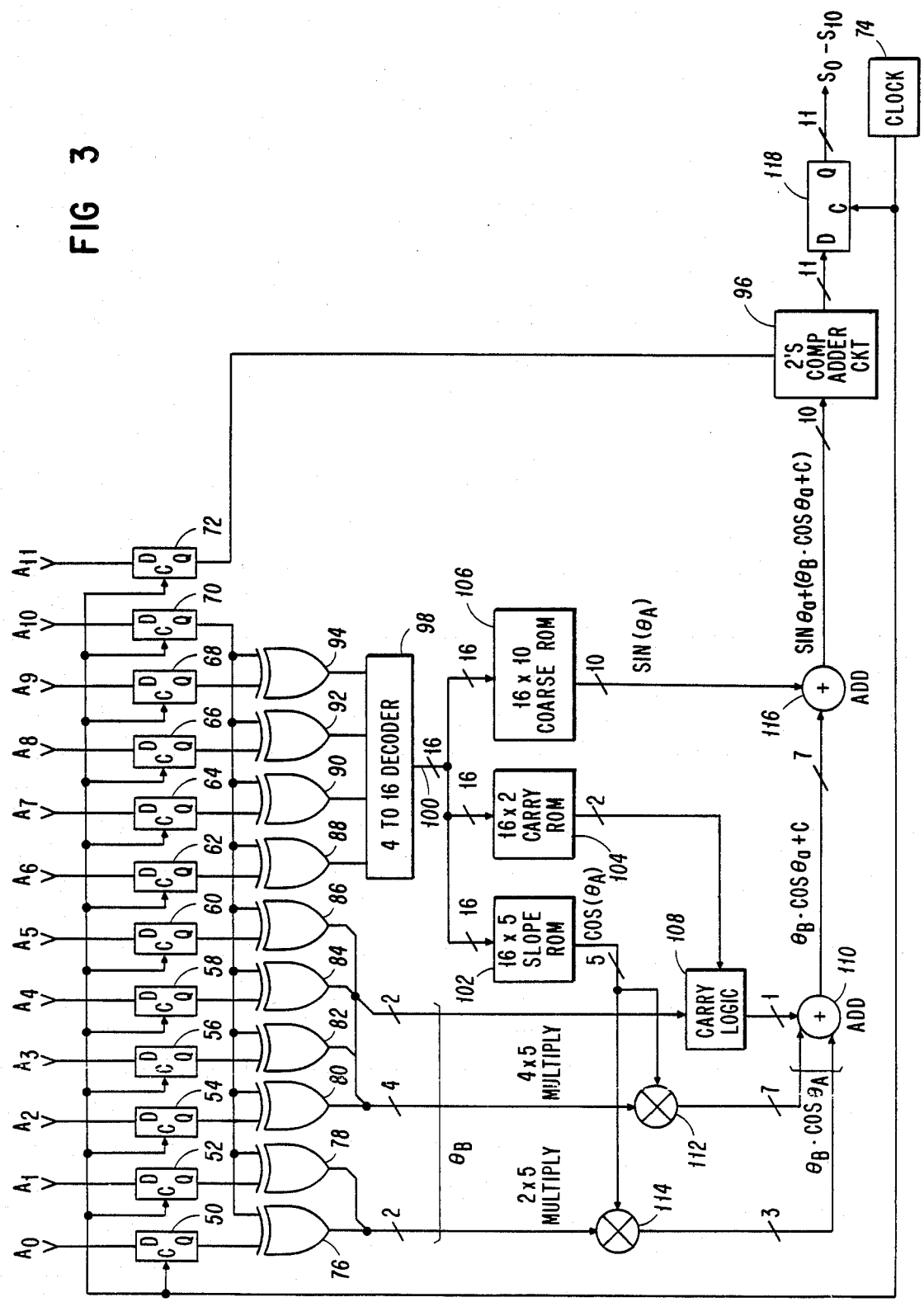
FIG. 3 is a schematic block diagram of circuitry for carrying out the present invention.

The scheme of the present invention is illustrated in the circuit of FIG. 3. Bits $A_0$–$A_{11}$ from accumulator 20 are fed to the D input terminals of a series of flip-flops 50–72 configured as latches. Each of the C terminals of latches 50–72 is coupled to a clock 74, and each of the output terminals Q of latches 50–68 is coupled to one input of exclusive-OR gates 76–94, respectively. The output terminal Q of latch 70 is coupled to the other inputs of each of exclusive-OR gates 76–94, and the output Q of latch 72 is coupled to one input of a 2's complement adder circuit 96.

The outputs of exclusive-OR gates 88–94 are coupled to the inputs of a 4-to-16 decoder which activates any one of its 16 output lines. The 16 output lines are schematically represented by a single line 100 labelled by a slash and the numeral 16. The same convention is used elsewhere in the drawings with respect to other multiple lines, the only difference being the number of lines represented. The 16 output lines from decoder 98 are all fed to the input of a 16 bit input—5 bit output slope ROM 102 which stores cosine values for the aforementioned $\theta a$, a 16 bit input—2 bit output carry ROM 104 which stores values of the aforementioned $c(\theta_a, \theta_b)$, and a 16 bit input—10 bit output coarse ROM 106, which stores sine values for the aforementioned $\theta_a$.

The outputs of exclusive-OR gates 84 and 86 are coupled to one input of a carry logic circuit 108. Also coupled to an input of carry logic circuit 108 are the two output bits from carry ROM 104. One bit from ROM 104 determines whether or not a carry bit is added to the waveform, and the other bit determines whether the bit should be added to the front or rear three-fourths of a segment. The single bit output of carry logic circuit 108 is coupled to one input of an adder 110. The outputs of exclusive-OR gates 80–86 are coupled to one input of a 4 bit by 5 bit multiplier 112. Also coupled to an input of multiplier 112 are the five output bits from slope ROM 102. The output of multiplier 112 is coupled to one input of adder 110.

The outputs of exclusive-OR gates 76 and 78 are coupled to one input of a 2-bit by 5-bit multiplier 114, the second of whose inputs is also coupled to the output of ROM 102. The output of multiplier 114 is coupled to another input of adder 110.

The output of adder 110, which adds the three bits from multiplier 114, the seven bits from multiplier 112, and the one bit from carry logic circuit 108, is coupled to one input of adder 116, the output input of which is coupled to the output of coarse ROM 106. The output of adder 116 is coupled to the data input of a 2's complement adder circuit 96, the control input of which is coupled to the Q output of latch 72. The output of 2's complement adder circuit (11 bits) 96 is coupled to eleven parallel latches 118, only one of which is shown. It should be understood that each of the 11 bits from 2's complement adder circuit 96 is inputted in the D input of a latch such as 118, and the C input of each of the eleven latches is coupled to clock 74. The eleven outputs from latches 118 are provided at the Q outputs and are symbolically represented as $S_0$–$S_{10}$. Bits $S_0$–$S_{11}$ are fed to a D/A converter such as that described in connection with FIG. 1.

The configuration of carry logic module 108 is shown in FIG. 4. Accumulator bits $A_4$ and $A_5$ are both coupled to a two-input NAND gate 130 and a two-input OR gate 132. The output of NAND gate 130 is in turn coupled to a three-input NAND gate 134, and the output of OR gate 132 is coupled to a three-input NAND gate 136. One bit from carry ROM 104 is coupled via line 138 to NAND gate 134 and to an inverter 140, the output of which is coupled to NAND gate 136. The second bit from carry ROM is coupled via line 142 to both NAND gates 134 and 136. The respective outputs of NAND gates 134 and 136 are coupled to a two-input NAND gate, the output of which is coupled to adder 110, as previously described in connection with FIG. 3.

The bit supplied by line 142 from carry ROM 104 to NAND gates 134 and 136 enables the outputs of those two gates and thus determines whether or not a carry bit is passed to adder 110. The bit supplied by line 138 in conjunction with accumulator bits $A_4$ and $A_5$ determines whether the carry bit should be added to the front or back three-fourths of a segment as previously described.

In the operation of the circuit of FIG. 3, accumulator 20 (FIG. 1) provides an incremental binary count to latches 50–72 in the form of bits $A_0$–$A_{11}$. These bits are temporarily held by latches 50–72, and the successive counts are clocked to exclusive-OR gates 76–94 by the action of clock 74 on the C inputs of latches 50–72. If bit $A_{11}$, which is referred to as the polarity bit, is set, then 2's complement circuit 96 is enabled by latch 72, thus negating the ten bits from adder 116, which represent the amplitude values of one-half of a sinusoidal wave cycle. Thus, it is necessary to generate the values for only one-half of a wave cycle, the negative polarity being generated by merely inverting the values generated for the positive one-half of the wave cycle.

If bit $A_{10}$, which is referred to as the quadrant bit, is set, then latch 70 produces an output bit at terminal Q which controls the operation of exclusive-OR gates 76–94. Bit $A_{10}$ divides each polarity of the sinusoidal waveform into two of the four, identical quadrants in the waveform, the inverting action of polarity bit $A_{11}$ providing the remaining two quadrants. Since the first quadrant (e.g., the 0–90 degree portion of a waveform) is identical to the second quadrant (e.g., the 10–180 degree portion), the amplitude values of only one quadrant need be generated since the amplitude values of the second quadrant are identical except that they are in reverse order. Thus, quadrant bit $A_{10}$ controls the order that amplitude values are generated by the input of accumulator bits $A_0$–$A_9$ by controlling the outputs of exclusive-OR gates 76–94.

Bits $A_6$–$A_9$ divide each quadrant into 16 segments. The bits are fed by latches 62–68 to exclusive-OR gates 88–94, which in turn feed them to decoder 98 depending upon the value of accumulator bit $A_{10}$. As is well known, exclusive-OR gates 80–94 (as well as gates 76–86) will provide an output only if one of the input bits is high (logical "1") and the other low (logical "0"). Decoder 98 sets one of its sixteen output lines high depending upon the value of its four input lines. Depending upon the decoder output line which is set high, slope ROM 102, carry ROM 104, and coarse ROM 106 provide the necessary output values to reconstruct the sinusoidal waveform.

Bits $A_0$–$A_5$ break each of the 16 sections in to 64 points, and thus they determine the manner in which the outputs of slope ROM 102 and carry ROM 104 are combined to produce the sinusoidal waveform. Bits $A_2$–$A_5$ are multiplied by the output value from slope ROM 102, and bits $A_1$ and $A_2$ are also, but separately, multiplied by the output of slope ROM 102. Bits $A_4$ and $A_5$ determine through the agency of carry logic circuit 108 whether a carry bit from carry ROM 104 is added to the front three-fourths or the back three-fourths of the waveform segment being reconstructed. The outputs from multipliers 112 and 114 and carry logic circuit 108 are summed together by adder 110. Thence, the output of adder 110 is summed with the output of coarse ROM 106, the output of which is negatived by 2's complement adder circuit 96, depnding upon the status of bit $A_{11}$. The resulting eleven bit amplitude value symbolically represented as $S_0$–$S_{11}$ is clocked through latches 118 to D/A converter 24 (FIG. 1) as previously described.

The method of the present invention thus uses trigonometrically identities and discrete logic functions to break the sine conversion process into several smaller lookup tables. Thus mathematically:

$$S = \sin(\theta_a + \theta_b) = \sin(\theta_a) \times \cos(\theta_b) + \cos(\theta_a) \times \sin(\theta_b)$$

It can be seen from this equation that if $\theta_b$ is kept small (i.e., $\theta_b \approx 0$), then:

$$\cos(\theta_b) = 1$$

and $$\sin(\theta_b) = \theta_b$$

Thus, the above equation becomes:

$$S = \sin(\theta_a) + \theta_b \times \cos(\theta_a)$$

This requires two lookup ROMs. One is a $\sin(\theta_a)$ ROM, or "coarse value" ROM (i.e., ROM 106 in FIG. 3), and the other is a $\cos(\theta_a)$, or "slope value" ROM (i.e., ROM 102 in FIG. 3).

This method uses smaller ROMs than the prior art method which used only a single $\theta$ROM, but it requires discrete logic devices to perform digital multiplication ($\theta_b \times \cos \theta_a$, i.e., multiplier 114 in FIG. 3), digital addition ($\sin(\theta_a) + \theta_b \times \cos(\theta_a)$, i.e., adder 110 in FIG. 3), and digital latches (i.e., latches 50–72 and 118 in FIG. 3) to "pipeline" the process for conversion speed reasons. This method may also be characterized as a linear interpolation process. The size of the ROMs and the number of bits carrier or truncated during the arithmetic functions determines the accuracy of the conversion process.

The two-ROM method thus far described has been demonstrated in the prior art, and its implementation requires large ROMs and a large number of discrete logic devices to perform the conversion with adequate accuracy.

The above method as further refined in the present invention further reduces the size of ROMs and the amount of logic required. This is accomplished by reducing the size of ROMs used in the interpolation process, truncating as much as possible, and adding a small third ROM and minimal discrete logic to compensate for errors due to these reductions. The overall conversion equation thus becomes:

$$S = \sin(\theta_a) + \theta_b \times \cos(\theta_a) + c(\theta_a, \theta_b)$$

where c=0 or 1, and is a function of $\theta_a$ and $\theta_b$.

The sine conversion process is thus broken up as follows:

$A_{11}$—controls polarity;

$A_{10}$—divides the foregoing polarity into four quadrants;

$A_6$–$A_9$—divides each quadrant into 16 sections (referred to as $\theta_a$ above);

$A_0$–$A_5$—divides each of the 16 sections into 64 points (referred to above as $\theta_b$).

The sixteen sections are the sections in which linear interpolation is performed. For each section, a sine value is stored in the "coarse" ROM 106, and a cosine value is stored in the "slope" ROM 102. Also for each section, two flags are stored in the "carry" ROM 104 to indicate whether an additional least significant bit (i.e., a carry bit) should be added during the interpolation process and whether this additional bit should be added in the first 48 points of the section (i.e., the front three-fourths of the section) or the last 48 points of the section (i.e., the back three-fourths of the section).

For each section, the carry ROM causes one of three possibilities:

1. No additional bit is added since linear interpolation provides adequate accuracy.

2. A bit is added to each of the first 48 points of the section since linear interpolation is inadequate at the beginning of the section.

3. A bit is added to each of the last 48 points of the section since linear interpolation is inadequate at the end of the section.

The amount of memory and number of gates required to store the additional carry ROM data, to determine the front or back three-fourths of a section, and to effect the least significant bit addition are must less than the required amount of memory and number of gates required when the coarse ROM and slope ROM are increased and more bits of resolution are used during the arithmetic operations.

While particular embodiments of the invention have been shown and described, it is obvious that minor changes and modifications may be made therein without departing from the true scope and spirit of the invention. It is the intention of the appended claims to cover all such changes and modifications.

I claim:

1. A digital sine conversion circuit, comprising:
    means for dividing a sine wave quadrant into a plurality of coarse phase angle intervals;
    means for dividing each of said coarse intervals into a plurality of intermediate phase angle intervals;
    means for storing an amplitude value associated with each coarse phase phase angle interval;
    means for storing a slope value associated with each intermediate phase angle interval;
    means for storing a carry value associated with each intermediate phase angle interval;
    means for providing the phase angle value at each intermediate phase angle interval;
    means for multiplying the phase angle value by the slope value at each intermediate phase angle interval to produce a first intermediate value;
    means for adding the carry value at each intermediate phase angle interval to the first intermediate value to produce a second intermediate value; and
    means for adding the coarse value to said second intermediate value to produce a sine wave amplitude value at each intermediate phase angle interval.

2. A digital sine conversion circuit as described in claim 1 further including means for 2's complementing the sine wave amplitude value.

3. A digital sine conversion circuit as described in claim 1 wherein said values in said carry value storing means have the value 1 for a first portion of an intermediate phase angle intervals and a value 0 for a second portion of the intermediate phase angle intervals.

4. A digital sine conversion circuit as described in claim 3 wherein said first portion of said intermediate phase angle intervals occupies greater than one half of said intermediate phase angle intervals.

5. A digital sine conversion circuit as described in claim 4 wherein said first portion of said intermediate phase angle intervals occupies three-fourths of said intermediate phase angle intervals.

6. A digital sine conversion circuit as described in claim 5 wherein said first portion precedes said second portion in time.

7. A digital sine conversion circuit as described in claim 5 wherein said first portion follows said second portion in time.

8. A digital sine conversion circuit as described in claim 5 wherein said carry value storing means contains two digital bits.

9. A digital sine conversion circuit as described in claim 5 wherein a first of said bits determines whether to add the value 1 at said first intermediate value intervals and the second of said bits determines whether the value 1 is added at said first intermediate value intervals at the first or the second three-fourths of said intermediate phase angle values.

10. A digital sine conversion circuit, comprising:
    means for dividing a sine wave quadrant into a plurality of coarse phase angle intervals;
    means for dividing each of said coarse intervals into a plurality of intermediate phase angle intervals;
    first read-only-memory for storing an amplitude value associated with each coarse phase angle interval;
    second read-only-memory for storing a slope value associated with each intermediate phase angle interval;
    third read-only-memory for storing a carry value associated with each intermediate phase angle interval;
    means for providing the phase angle value at each intermediate phase angle interval;
    means for multiplying the phase angle value by the slope value at each intermediate phase angle interval to produce a first intermediate value;
    an adder adding the carry value at each intermediate phase angle interval to the first intermediate value to produce a second intermediate value;
    means for restricting addition of said carry value at either the first or the second three-fourths of said intermediate phase angle intervals;
    means for determining which of the first and second three-fourths of said phase angle intervals to which said carry bit will be added; and
    means for adding the coarse value to said second intermediate value to produce a sine wave amplitude value at each intermediate phase angle interval.

* * * * *